(12) United States Patent
Burckart et al.

(10) Patent No.: US 7,970,915 B2
(45) Date of Patent: Jun. 28, 2011

(54) METHOD, SYSTEM AND PROGRAM PRODUCT FOR CLOSING A COMMUNICATION SESSION WITH OUTSTANDING DATA COMMANDS ON A TRANSPORT COMMUNICATION SYSTEM

(75) Inventors: Erik J. Burckart, Raleigh, NC (US); David B. Gilgen, Raleigh, NC (US); Craig A. Lanzen, Lambertville, MI (US); William D. Wigger, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 10/952,106

(22) Filed: Sep. 28, 2004

(65) Prior Publication Data

US 2006/0075125 A1   Apr. 6, 2006

(51) Int. Cl.
*G06F 15/16* (2006.01)
*G06F 15/173* (2006.01)
*H04L 12/28* (2006.01)

(52) U.S. Cl. ........ 709/229; 709/224; 709/204; 709/250; 370/396

(58) Field of Classification Search .................. 709/229, 709/224, 204, 250; 370/396
See application file for complete search history.

(56) References Cited

U.S. PATENT DOCUMENTS

| 5,508,942 | A | * | 4/1996 | Agarwal | 709/204 |
| 5,781,598 | A |   | 7/1998 | Hardy, III |   |
| 5,948,062 | A | * | 9/1999 | Tzelnic et al. | 709/219 |
| 6,356,949 | B1 |   | 3/2002 | Katsandres et al. |   |
| 6,810,431 | B1 | * | 10/2004 | Narisi et al. | 709/250 |
| 7,046,680 | B1 | * | 5/2006 | McDysan et al. | 370/396 |
| 7,167,947 | B2 | * | 1/2007 | Rotithor et al. | 711/105 |
| 2004/0010596 | A1 |   | 1/2004 | Hui |   |
| 2006/0064481 | A1 | * | 3/2006 | Baron et al. | 709/224 |

* cited by examiner

*Primary Examiner* — Phuoc Nguyen
*Assistant Examiner* — Mark D Fearer
(74) *Attorney, Agent, or Firm* — Steven M. Greenberg, Esq.; Carey, Rodriguez, Greenberg & Paul

(57) ABSTRACT

Under the present invention, when a TCS receives a data command (e.g., a read or write command) pursuant to a communication session between the TCS and an application, it will first request permission from a permission system to execute the data command. By applying a set of rules to a setting of a state variable associated with the TCS, the permission system will determine whether to grant the permission. If so, the TCS will execute the data command and change the setting of the state variable. If a close command is later received by the TCS to close the communication session, permission will once again be requested from the permission system, which will again apply a set of rules to the current setting of the state variable to determine if the session can be safely closed.

20 Claims, 3 Drawing Sheets

METHOD, SYSTEM AND PROGRAM PRODUCT FOR CLOSING A COMMUNICATION SESSION WITH OUTSTANDING DATA COMMANDS ON A TRANSPORT COMMUNICATION SYSTEM

BACKGROUND OF THE INVENTION

1. Field of the Invention

In general, the present invention relates to processing commands on a transport communication system (TCS). More specifically, the present invention provides a method, system and program product for closing a communication session with outstanding data commands on a TCS.

2. Related Art

As the use of network communications in software solutions becomes more common, various issues regarding session closures are raised. For example, in a transport communication system (TCS) multiple transport/protocol layers are included. An application will typically send a data command/request (e.g., a read or write command) to the TCS (which is processed by one or more of the transport layers), and then wait to receive a response. This period of communication between the application and the TCS is commonly known as a communication session. However, in communication systems that process an asynchronous read data or write data command, there needs to be a fast and safe way to close a communication session while the read or write is outstanding.

The problem and solution are unique in that each read, write, or close command involves processing at each transport layer. Specifically, one layer works on the command, and then sends the command to the next layer, and so on. When the last layer receives the command, it then sends the response back up the series of layers, and each layer also can process the response. However, the TCS needs to be very performance sensitive, avoiding as much as possible semaphore and synchronization logic.

In general, a close command cannot be indiscriminately given to the TCS at the same time the read or write is being processed by the TCS, or the system may fail due to data integrity problems and or race conditions. One known approach to this problem is to have the application code that sits "above" the TCS to attempt a read or write with a short timeout, and if the read or write returns after the timeout amount of time without completing the read or write operation, then the application code can decide to close the session. This method is cumbersome for the application to implement, and can degrade performance significantly. Another approach is it to implement synchronization logic so that each transport layer can synchronize itself on whatever operation it is currently executing so that more than one operation is not attempted. However, as indicated above, there is a desire to avoid implementing such logic due to the effort and resources it would require.

In view of the foregoing, there exists a need for a method, system and program product for closing a communication session with outstanding data commands on a TCS. Specifically, a need exists for a system that can allow a communication session with TCS having current data command to be closed without causing errors or performance degradation.

SUMMARY OF THE INVENTION

In general, the present invention provides a method, system and program product for closing a communication session with outstanding data commands on a Transport Communication System (TCS). Specifically, under the present invention, when a TCS receives a data command (e.g., a read or write command) pursuant to a communication session between the TCS and an application, it will first request permission from a permission system to execute the data command. By applying a set of rules to a setting of a state variable associated with the TCS, the permission system will determine whether to grant the permission. If so, the TCS will execute the data command and change the setting of the state variable. If a close command is later received by the TCS to close the communication session, permission will once again be requested from the permission system, which will again apply a set of rules to the current setting of the state variable to determine if the session can be safely closed.

A first aspect of the present invention provides a method for closing a communication session without outstanding data commands on a Transport Communication System (TCS), comprising: receiving a data command in a TCS; requesting permission from a permission system to execute the data command; and the permission system determining whether to grant the permission by applying a set of rules to a current setting of a state variable associated with the TCS.

A second aspect of the present invention provides a system for closing a communication session without outstanding data commands on a Transport Communication System (TCS), comprising: a TCS for receiving commands from an application pursuant to a communication session between the TCS and the application; and a permission system for determining whether to grant permission to execute the commands by applying a set of rules to a setting of a state variable associated with the TCS.

A third aspect of the present invention provides a method for closing a communication session without outstanding data commands on Transport Communication System (TCS), comprising: receiving a request from a TCS for permission to execute a data command received on the TCS; determining whether to grant the permission by applying a set of rules to a setting of a state variable associated with the TCS; and outputting a result of the determining to the TCS.

A fourth aspect of the present invention provides a system for closing a communication session without outstanding data commands on Transport Communication System (TCS), comprising: a system for receiving a request from a TCS for permission to execute a data command received on the TCS; a system for determining whether to grant the permission by applying a set of rules to a setting of a state variable associated with the TCS; and a system for outputting a result of the permission processing system to the TCS.

A fifth aspect of the present invention provides a program product stored on a recordable medium for closing a communication session without outstanding data commands on a Transport Communication System (TCS), which when executed, comprises: program code for receiving a request from a TCS for permission to execute a data command received on the TCS; program code for determining whether to grant the permission by applying a set of rules to a setting of a state variable associated with the TCS; and program code for outputting a result of the permission processing system to the TCS.

A sixth aspect of the present invention provides a method for deploying an application for closing a communication session without outstanding data commands on a Transport Communication System (TCS), comprising: providing a computer infrastructure being operable to: receive a request from a TCS for permission to execute a data command received on the TCS; determine whether to grant the permission by applying a set of rules to a setting of a state variable associated with the TCS; and output a result of the permission processing system to the TCS.

A seventh aspect of the present invention provides computer software stored embodied in a propagated signal for closing a communication session without outstanding data commands on Transport Communication System (TCS), the computer software comprising instructions to cause a computer system to perform the following functions: receive a request from a TCS for permission to execute a data command received on the TCS; determine whether to grant the permission by applying a set of rules to a setting of a state variable associated with the TCS; and output a result of the permission processing system to the TCS.

Therefore, the present invention provides a method, system and program product for closing a communication session with outstanding data commands on a multiple TCS.

BRIEF DESCRIPTION OF THE DRAWINGS

These and other features of this invention will be more readily understood from the following detailed description of the various aspects of the invention taken in conjunction with the accompanying drawings in which.

Figure 1:
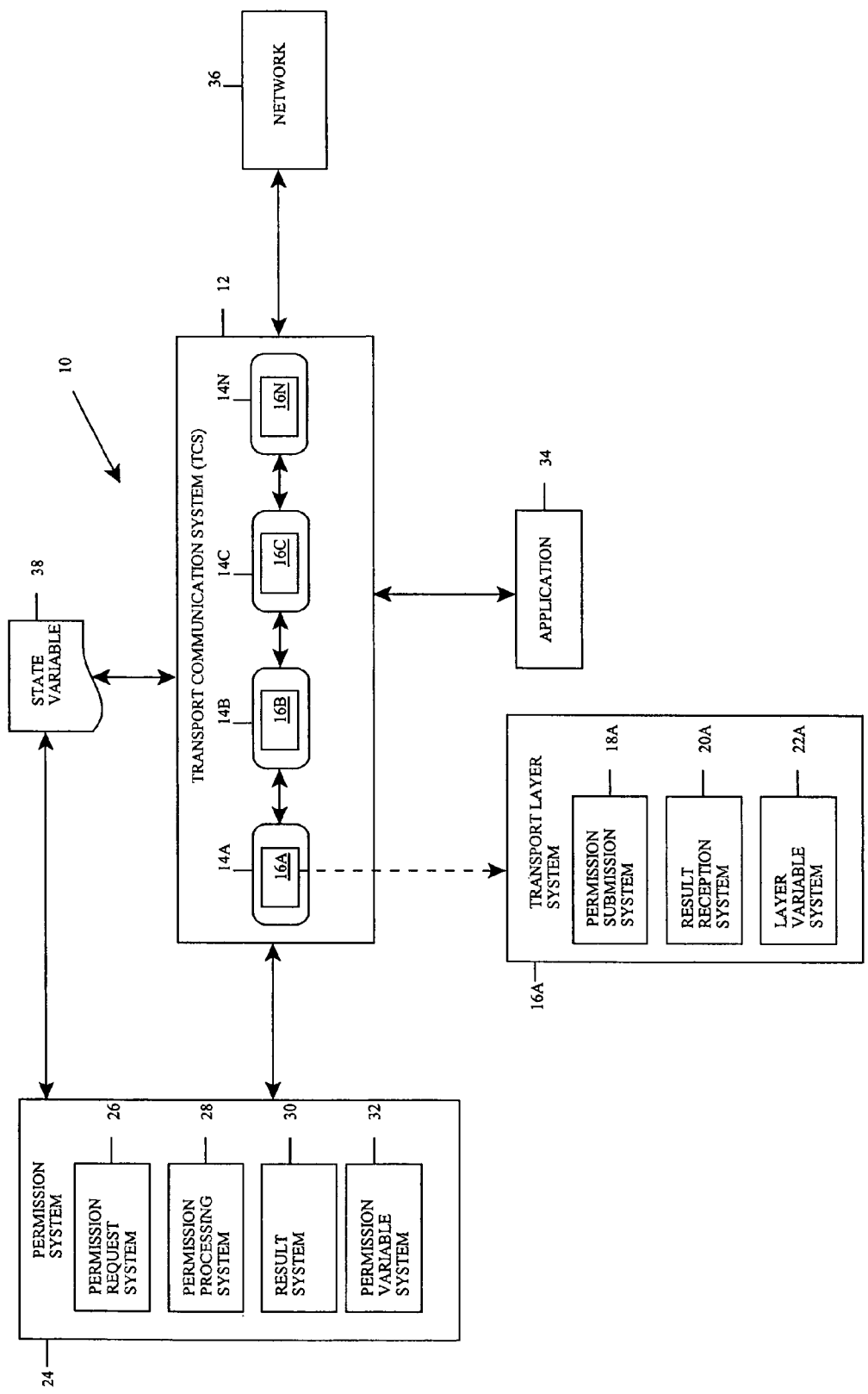
FIG. 1 depicts a system for closing a communication session with outstanding data commands on a Transport Communication System (TCS) according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience purposes the Detailed Description of the Drawings will have the following sections:
I. General Description
II. Illustrative Example
III. Computerized Implementation I. General Description As indicated above, the present invention provides a method, system and program product for closing a communication session with outstanding data commands on a Transport Communication System (TCS). Specifically, under the present invention, when a TCS receives a data command (e.g., a read or write command) pursuant to a communication session between the TCS and an application, it will first request permission from a permission system to execute the data command. By applying a set of rules to a setting of a state variable associated with the TCS, the permission system will determine whether to grant the permission. If so, the TCS will execute the data command and change the setting of the state variable. If a close command is later received by the TCS to close the communication session, permission will once again be requested from the permission system, which will again apply a set of rules to the current setting of the state variable to determine if the session can be safely closed.

As used herein, the term Transport Communication System (TCS) is intended to mean any system that allows commands to be transported over a network in various protocols. One example of a TCS is a "channel chain" currently being developed by International Business Machines Corp of Armonk, N.Y. In general, a channel is a layer of software that implements a specific function, whereas a channel chain is a chain/series of channels where one transport layer is linked to another transport layer to handle the processing a piece data. In a channel chain, data can flow down the chain, and then turn around and flow back up the same chain.

Referring now to FIG. 1, an illustrative system 10 for closing a communication session with outstanding data commands on a TCS in accordance with the present invention is shown. As depicted, system 10 includes TCS 12 having transport/protocol layers 14A-N. In an illustrative embodiment, transport layer 14A represents the top of TCS 12 and transport layer 14N represents the tail of TCS 12. In general, TCS 12 will receive commands/requests from application 34 pursuant to a communication session established therebetween. Execution of those requests may cause TCS 12 (or transport layers 14A-N thereof) to interface with external infrastructure such as network 36. For example, transport layer 14A might receive a data command from application 34 and then pass the data command through transport layers 14B-N to network 36. Thereafter, a response might be received from network 36 on transport layer 16N and be passed up through transport layer 14A to application. It should be understood that in an illustrative embodiment, TCS 12 could represent a "channel chain," whereas transport layers 14A-N could represent the "channels" thereof.

Regardless, under the present invention transport layers 14A-N are each shown as including a transport layer system 16A-N (e.g., program code or logic) for interfacing with permission system 24 (program code or logic). It should be understood that although each transport layer 14A-N is shown as including its own transport layer system 16A-N, this need not be the case. For example, only the top transport layer 14A and the tail transport layer 14N of TCS 12 could include a transport layer system. Alternatively, a single "common" transport layer system could be provided for the entire TCS 12. This single transport layer system would coordinate all communications between any of the transport layers 14A-N and permission system 24. It should also be assumed that TCS 12, permission system 24 and application 34 could exist under any architecture. For example, all three could reside on a single computer system. Alternatively, they could reside on multiple, or separate computer systems. To this extent, any computer system(s) on which these components are realized could be part of a larger computer infrastructure.

In any event, assume that TCS 12 receives a data command (e.g., a read or write command) from application 34. Under previous systems, TCS would simply execute the data command in normal fashion (e.g., by passing the data command down through the transport layers 14A-N and the passing the response back up the transport layers 14N-A to application 34). However, under the present invention, TCS 12 will interface will permission system 24 before executing any commands. For example, upon initially receiving the data command, transport layer system 16A of top transport layer 14A will execute. In a typical embodiment, permission submission system 18A will generate and send a request for permission to execute the data command to permission system 24. The permission request will be received by permission request system 26 and then passed to permission processing system 28 for processing.

Permission processing system 28 will determine whether to grant permission to execute the data command by applying a set of rules to a setting of state variable 38 associated with TCS 12. Listed below are illustrative settings for state variable 38:

(1) NOT_IN_USE: No permissions have been requested.
(2) READ_PENDING: Permission to execute a read data command has been granted.
(3) WRITE_PENDING: Permission to execute a write data command has been granted.
(4) CLOSE_ALLOWED: The read or write data command, while outstanding, can be cancelled in the TCS (e.g., it has been temporarily passed to network 36).
(5) CLOSE_PENDING: The session is being closed. No more data command processing is permitted.
(6) READ_FINISHING: The read data command is once again being processed by the TCS (e.g., after being temporarily passed to network 36).
(7) READ_DONE: The read data command has been completed by the calling application 34.
(8) WRITE_FINISHING: The write data command is once again being processed by the TCS (e.g., after being temporarily passed to network 36).
(9) WRITE_DONE: The write data command has been completed by the calling application 34.

It should be appreciated that these settings are intended to be illustrative only and that others could be implemented hereunder. Moreover, although separate settings have been shown for identical states of similar data commands, this need no be the case. For example, the READ_FINISHING AND WRITE_FINISHING settings could be embodied as a single DATACOMMAND_FINISHING setting. This same notion applies to the READ_PENDING and WRITE_PENDING settings, as well as the READ_DONE and WRITE_DONE settings.

Regardless, permission processing system 28 will apply the following set of rules to the setting of state variable 38:
(1) Permission to execute a read data command:
  A. Permission to be granted if the setting is: NOT_IN_USE or READ_DONE.
  B. Permission will not be granted if the setting is: READ_PENDING, CLOSE_ALLOWED, CLOSE_PENDING, or READ_FINISHING.
(2) Permission to execute a write data command:
  A. Permission to be granted if the setting is: NOT_IN_USE, or WRITE_DONE.
  B. Permission will not be granted if the setting is: WRITE_PENDING, CLOSE_ALLOWED, CLOSE_PENDING, or, WRITE_FINISHING.
(3) Permission to complete a read data command
  A. Permission to be granted if the setting is: NOT_IN_USE, READ_PENDING, READ_DONE, or CLOSE_ALLOWED.
  B. Permission will not be granted if the setting is: CLOSE_PENDING, or READ_FINISHING.
(4) Permission to complete a write data command
  A. Permission to be granted if the setting is: NOT_IN_USE, WRITE_PENDING, WRITE_DONE, or CLOSE_ALLOWED.
  B. Permission will not be granted if the setting is: CLOSE_PENDING, or WRITE_FINISHING.
(5). Permission to close the session
  A. Permission to be granted if the setting is: NOT_IN_USE, READ_DONE, WRITE_DONE, CLOSE_ALLOWED.
  B. Permission will not be granted if the setting is: READ_PENDING, READ_FINISHING, WRITE_PENDING, WRITE_FINISHING, or CLOSE_PENDING.

Similar to the possible settings of state variable 38, these rules are intended to be illustrative only and be condensed into more generic form. For example, instead of separate rules for permission to execute a read data command and permission to execute a write data command, a singular rule for executing a data command could be provided. The rules are shown as such above only to provide an illustrative embodiment.

Assume that when the data command was received from application 34, the setting of state variable was NOT_IN_USE. Based on the above set of rules, permission processing system 28 would grant permission to execute the data command. This result would be sent by result system 30, and received by result reception system 20A of transport layer system 16A. The transport layer 14A and the rest of the chain would then execute the data command. In addition, layer variable system 22A of transport layer system 16A would then change the setting of state variable 38 to READ_PENDING, or WRITE_PENDING (depending on the type of data command that was being executed).

Assume now that the initial data command was passed through TCS 12 to tail transport layer 14N, at which point the data command was sent out to network 36. Since no active work was being performed by transport layers 14A-N, the setting of state variable 38 would be set to CLOSE_ALLOWED (e.g., by layer variable system 22N of transport layer system 16N). If at this point application 34 then issued a close command to close the communication session, transport layer 14A would repeat the above steps of interfacing with permission system 24 to request permission to execute the close command. Based on the setting of state variable 38 and the above rules, the permission to close the session would be granted. At that point, permission variable system 32 would change the setting of state variable to CLOSE_PENDING. With such a setting, no other data commands would be permitted to execute.

However, assume that the data command was received back on TCS 12 from network 36 (e.g., by tail transport layer 14N) before a close command was issued. IN this case, permission submission system 18N of transport layer system 16N would request permission from permission system 24 to finish executing the data command in the same manner as described above. Based on the above set of rules and the setting of state variable 38 being CLOSE_ALLOWED (not CLOSE_PENDING), permission to complete the data command would be granted by permission processing system 28 (and outputted by result system 30 to result reception system 32N). At that point, transport layer 14N would begin the process of completing data command (e.g., passing the result from network 36 up through TCS 12) while layer variable system 32N of transport layer system 16N changes the setting of state variable 38 to READ_FINISHING or WRITE_FINISHING (again, depending on the type of data command issued).

As can be seen from the above rules, such settings would prevent permission to execute a close command from being granted. However, once the execution of the data command was completed by TCS 12, the setting of state variable 38 could be changed by layer variable system 32A to READ_DONE or WRITE_DONE. At that point, permission to execute a close command would be granted. As mentioned above, when permission to execute a close command is granted, permission variable system 32 of permission system 24 will change the setting of state variable 38 to CLOSE_PENDING. Once the communication session is closed, the setting of state variable 38 can then be changed or reset back to NOT_IN_USE (e.g., by layer variable system 22A or permission variable system 32).

II. Illustrative Example

Figure 2:
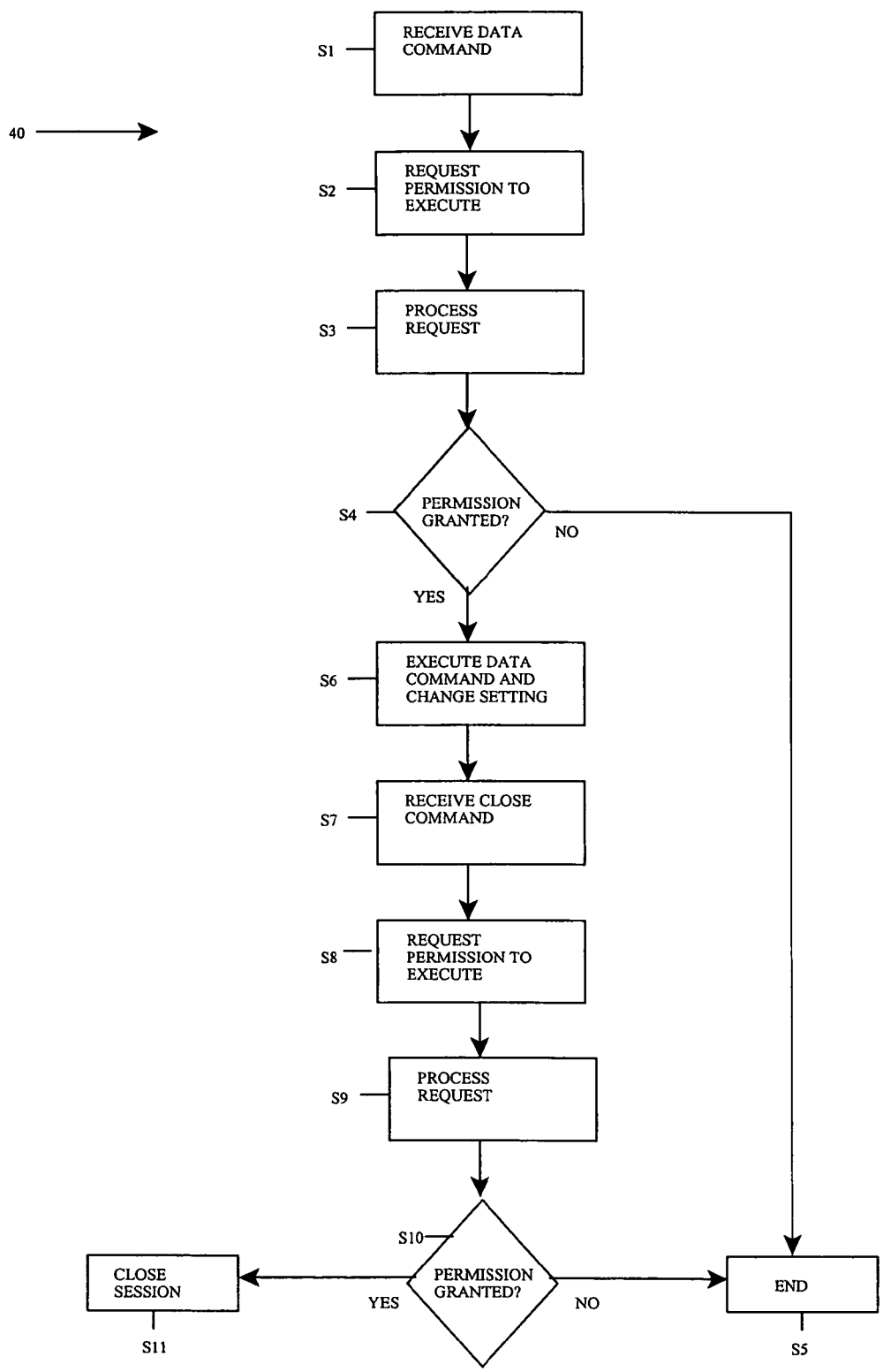
FIG. 2 depicts a method flow diagram of an illustrative example according to the present invention.

Referring now to FIG. 2, a flow diagram 40 corresponding to an illustrative example of the present invention is shown. In first step S1, a data command is received on the TCS. In step S2, permission is requested to execute the data command. The request will be process in step S3 by applying the set of rules to the current setting of state variable as described above. If permission is not granted in step S4 (e.g., a close is pending), the process will end in Step S5. However, if permission is granted based on the setting and the rules, the data command will be executed, and the setting of state variable will be changed accordingly in step S6. In step S7, a close command is received on the TCS. Permission to execute the close command will be requested in step S8, which will be processed in step S9. As described above, the close command will only be permitted if the setting is NOT_IN_USE, READ_DONE, WRITE_DONE, or CLOSE_ALLOWED. The CLOSE_ALLOWED setting arises when a data command is (temporarily) off-loaded from the TCS such as being sent to a network for further processing. If permission is granted in step S10, the session will be closed in step S11. However, if the setting of state variable is such that the rules will not allow a session close, the processes will end in step S5.

III. Computerized Implementation

Figure 3:
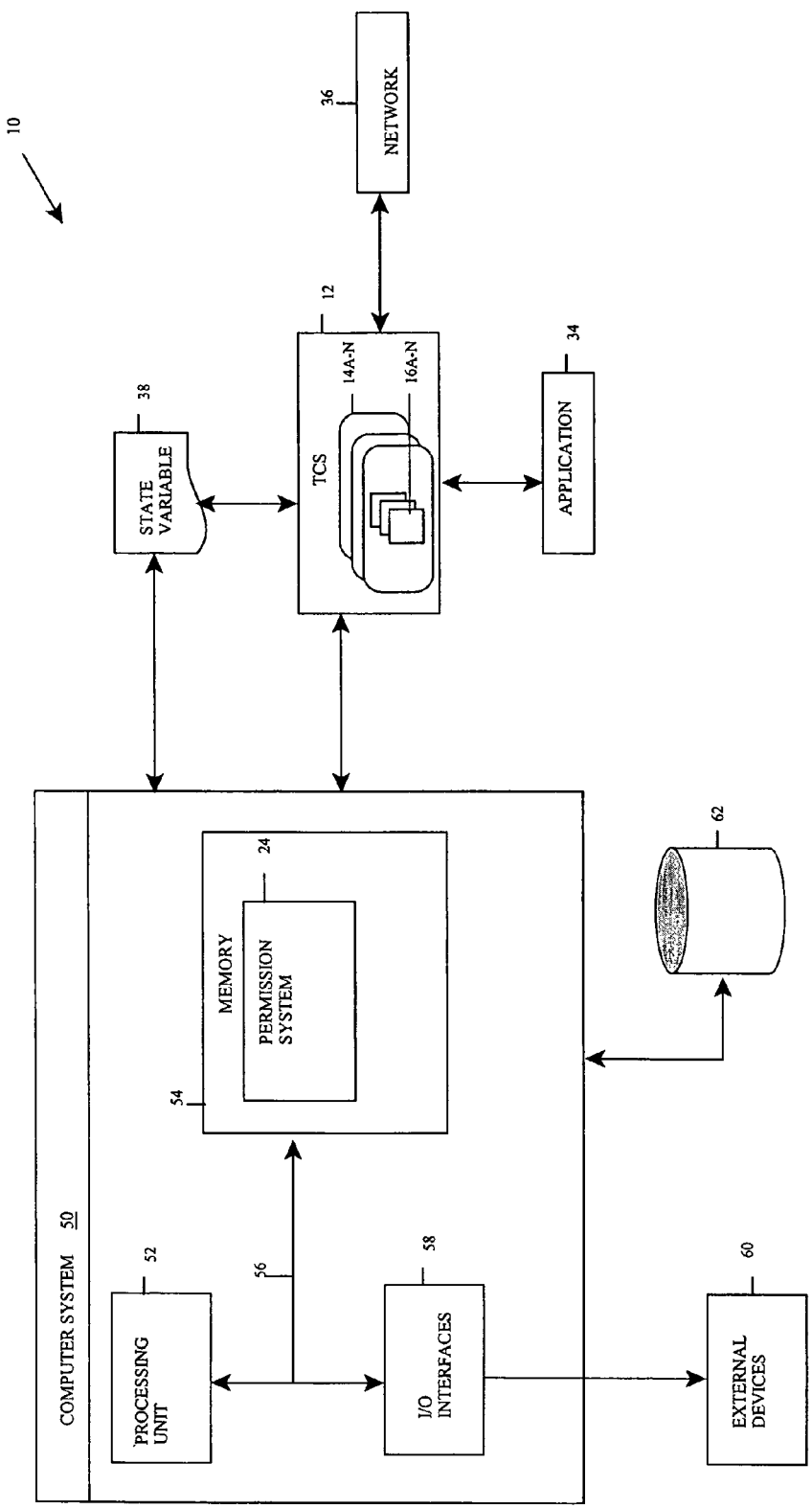
FIG. 3 depicts a more specific computerized implementation of the system of FIG. 1.

As indicated above, the present invention is typically realized in a computerized environment. FIG. 3 shows a more specific implementation of such an environment. Specifically, as shown in FIG. 3, permission system 24 is shown on computer system 50. It should be appreciated, however, that TCS 12, application 34 and state variable 38 will similarly be embodied on a computer system. To this extent, permission system 24, TCS 12, application 34 and state variable 38 could all be implemented on the same computer system 50. Alternatively, these systems/components could be implemented on two or more computer systems (not shown in FIG. 3 for brevity purposes). It should further be understood that computer system 50 (and any other computer systems) could be part of a larger computer infrastructure. In addition, computer system 50 should be understood to be any type of computerized device capable of carrying out the teachings of the present invention. For example, computer system 50 can be a desktop computer, a laptop computer, a hand held device, a client, a server, etc.

In addition, the teachings of the present invention can be implemented via a stand-alone system, or over a network such as the Internet, a local area network (LAN), a wide area network (WAN), a virtual private network (VPN), etc. In the case of the latter, communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown, computer system 50 generally includes processing unit 52, memory 54, bus 56, input/output (I/O) interfaces 58, external devices/resources 60 and storage unit 62. Processing unit 52 may comprise a single processing unit, or be distributed across one or more processing units in one or more locations, e.g., on a client and server. Memory 54 may comprise any known type of data storage media and/or transmission media, including magnetic media, optical media, random access memory (RAM), read-only memory (ROM), a data cache, a data object, etc. Moreover, similar to processing unit 52, memory 54 may reside at a single physical location, comprising one or more types of data storage, or be distributed across a plurality of physical systems in various forms.

I/O interfaces 58 may comprise any system for exchanging information to/from an external source. External devices/resources 60 may comprise any known type of external device, including speakers, a CRT, LED screen, hand-held device, keyboard, mouse, voice recognition system, speech output system, printer, monitor/display, facsimile, pager, etc. Bus 56 provides a communication link between each of the components in computer system 50 and likewise may comprise any known type of transmission link, including electrical, optical, wireless, etc.

Storage unit 62 can be any system (e.g., a database, etc.) capable of providing storage for information (e.g., possible state variable settings, rules, etc.) under the present invention. As such, storage unit 62 could include one or more storage devices, such as a magnetic disk drive or an optical disk drive. In another embodiment, storage unit 62 includes data distributed across, for example, a local area network (LAN), wide area network (WAN) or a storage area network (SAN) (not shown). Although not shown, additional components, such as cache memory, communication systems, system software, etc., may be incorporated into computer system 50. In addition, should TCS 12, application 34 and/or state variable 38 be realized on separate computer systems, such computer systems will have components similar to computer system 50.

Shown in memory 54 of computer system 50 as a program product is permission system 24. Although not shown, transport layers 14A-N, transport layer systems 16A-N and application 34 could also be stored in memory of computer system 50 (or similar computer system(s)). In any event, permission system 24 and transport layer systems 16A-N will carry out the functions described above. Specifically, as data commands and/or close commands are received on TCS 12 from application 34 or network 36, permission will be requested from permission system 24. Upon receiving a permission request, permission system 24 will apply a set of rules to a setting of state variable to determine whether the permission should be granted.

It should be appreciated that the present invention could be offered as a business method on a subscription or fee basis. For example, computer system 50 and/or permission system 24 could be created, supported, maintained and/or deployed by a service provider that offers the functions described herein for customers. That is, a service provider could offer to coordinate permission processing for customers.

It should also be understood that the present invention could be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although the setting of state variable 38 was indicated as being changed by certain specific systems in certain situations, it should be understood that these roles/duties could be altered within the scope of the present invention.

We claim:

1. A method for managing a communication session on a Transport Communication System (TCS), comprising:
    receiving a data command in a TCS for the communication session, the TCS being a series of channels, every channel being a layer of software that implements a specific function, the channels being linked together for processing a piece of data, the data flowing bi-directionally between channels in the series, the data command comprising one of: a read, write or close command;
    before executing the data command, requesting permission from a permission system to execute the data command; and,
    receiving a response to the request from the permission system, wherein the permission system determines whether to grant the permission by applying a set of rules to a current setting of a state variable associated with the TCS, wherein, if data command is a close command, the set of rules grant permission when the state variable indicates one of: that the TCS is not in use, that a previous read or write data command is done, or that the session is allowed to close and wherein, if data command is a close command, the set of rules do not grant permission when the state variable indicates one of: that the TCS is processing another read or write data command or the session is closing; and wherein, if the data command is a read or write command, the set of rules denies permission when the state variable indicates a close command is pending or has been allowed and grants permission when the state variable indicates that no close command is pending or has been allowed;
    wherein the setting is selected from the group consisting of not in use, read pending, close allowed, close pending, read command finishing, read done, write pending, write finishing and write done.

2. The method of claim 1, further comprising:
    executing the data command if the permission system grants the permission; and
    setting the state variable to a particular setting based on the execution to reflect at least one of the data command is pending, that the data command is finishing, that the data command is done and a close has been allowed.

3. The method of claim 2, wherein the setting step is performed by a transport layer in the TCS executing the data command.

4. The method of claim 1, further comprising the permission system setting the state variable to another setting indicating that a close is pending if the permission to execute the close command is granted.

5. The method of claim 1, wherein the set of rules set forth situations where permissions can be granted based on settings of the state variable.

6. A system for managing a communication session on a Transport Communication System (TCS), comprising:
    a TCS for receiving and executing commands from an application pursuant to a communication session between the TCS and the application, the TCS being a series of channels, every channel being a layer of software that implements a specific function, the channels being linked together for processing a piece of data, the data flowing bi-directionally between channels in the series, and the TCS being configured to request permission to execute the commands, the commands comprising one of: read, write or close command; and
    a permission system for determining, before the TCS executes the commands, whether to grant permission to execute the commands by applying a set of rules to a setting of a state variable associated with the TCS, wherein, if data command is a close command, the set of rules grant permission when the state variable indicates one of: that the TCS is not in use, that a previous data command is done, or that the session is allowed to close and wherein if data command is a close command, the set of rules do not grant permission when the state variable indicates one of: that the TCS is processing another read or write data command or the session is closing; and wherein if the data command is a read or write command, the set of rules denies permission when the state variable indicates a close command is pending or has been allowed and grants permission when the state variable indicates that no close command is pending or has been allowed;
    wherein the setting is selected from the group consisting of not in use, read pending, close allowed, close pending, read command finishing, read done, write pending, write finishing and write done.

7. The system of claim 6, wherein the command is a data command, and wherein the TCS executes the data command if the permission system grants the permission, sets the state variable to a particular setting based on the execution to reflect at least one of the data command is pending, that the data command is finishing, that the data command is done and a close has been allowed.

8. The system of claim 7, wherein the permission system further sets the state variable to another setting indicating that a close is pending if the permission to execute the close command is granted.

9. The system of claim 6, wherein the set of rules set forth situations where permissions can be granted based on settings of the state variable.

10. A method for managing a communication session on a Transport Communication System (TCS), comprising:
    receiving a request from a TCS for permission to execute a data command received on the TCS, the TCS being a series of channels, every channel being a layer of software that implements a specific function, the channels being linked together for processing a piece of data, the data flowing bi-directionally between channels in the series, the data command comprising one of: a read, write or close command;
    before executing the data command, determining whether to grant the permission by applying a set of rules to a setting of a state variable associated with the TCS, wherein, if data command is a close command, the set of rules grant permission when the state variable indicates one of: that the TCS is not in use, that a previous read or write data command is done, or that the session is allowed to close and wherein, if data command is a close command, the set of rules do not grant permission when the state variable indicates one of: that the TCS is processing another read or write data command or the session is closing; and wherein if the data command is a read or write command, the set of rules denies permission when the state variable indicates a close command is pending or has been allowed and grants permission when the state variable indicates that no close command is pending or has been allowed;

wherein the setting is selected from the group consisting of not in use, read pending, close allowed, close pending, read command finishing, read done, write pending, write finishing and write done; and outputting a result of the determining to the TCS.

11. The method of claim 10, further comprising changing the setting of the state variable to indicate that a close is pending if the permission to execute the close command is granted.

12. The method of claim 10, wherein the set of rules set forth situations where permissions can be granted based on settings of the state variable.

13. A system for managing a communication session on a Transport Communication System (TCS), comprising:

a system for receiving a request from a TCS for permission to execute a data command received on the TCS, the TCS being a series of channels, every channel being a layer of software that implements a specific function, the channels being linked together for processing a piece of data, the data flowing bi-directionally between channels in the series, the data command comprising one of: a read, write or close command;

a system for determining, before the TCS executes the data command, whether to grant the permission by applying a set of rules to a setting of a state variable associated with the TCS, wherein, if data comand is a close command, the set of rules grant permission when the state variable indicates one of: that the TCS is not in use, that a previous read or write data command is done, or that the session is allowed to close and wherein, if data command is a close command, the set of rules do not grant permission when the state variable indicates one of: that the TCS is processing another data read or write command or the session is closing; and wherein, if the data command is a read or write command, the set of rules denies permission when the state variable indicates a close command is pending or has been allowed and grants permission when the state variable indicates that no close command is pending or has been allowed;

wherein the setting is selected from the group consisting of not in use, read pending, close allowed, close pending, read command finishing, read done, write pending, write finishing and write done; and a system for outputting a result of the permission processing system to the TCS.

14. The system of claim 13, further comprising a system for changing the setting of the state variable to indicate that a close is pending if the permission to execute the close command is granted.

15. The system of claim 13, wherein the set of rules set forth situations where permissions can be granted based on settings of the state variable.

16. A program product stored on a recordable storage media for closing managing a communication session on a Transport Communication System (TCS), which when executed, comprises:

program code for receiving a request from a TCS for permission to execute a data command received on the TCS, the TCS being a series of channels, every channel being a layer of software that implements a specific function, the channels being linked together for processing a piece of data, the data flowing bi-directionally between channels in the series, the data command comprising one of: a read, write or close command;

program code for determining, before the TCS executes the data command, whether to grant the permission by applying a set of rules to a setting of a state variable associated with the TCS, wherein, if data command is a close command, the set of rules grant permission when the state variable indicates one of: that the TCS is not in use, that a previous read or write data command is done, or that the session is allowed to close and wherein, if data command is a close command, the set of rules do not grant permission when the state variable indicates one of: that the TCS is processing another data read or write command or the session is closing; and wherein, if the data command is a read or write command, the set of rules denies permission when the state variable indicates a close command is pending or has been allowed and grants permission when the state variable indicates that no close command is pending or has been allowed;

wherein the setting is selected from the group consisting of not in use, read pending, close allowed, close pending, read command finishing, read done, write pending, write finishing and write done; and program code for outputting a result of the permission processing system to the TCS.

17. The program product of claim 16, further comprising program code for changing the setting of the state variable to indicate that a close is pending if the permission to execute the close command is granted.

18. The program product of claim 16, wherein the set of rules set forth situations where permissions can be granted based on settings of the state variable.

19. A method for deploying an application for managing a communication session on a Transport Communication System (TCS), comprising:

providing a computer infrastructure being operable to:

receive a request from a TCS for permission to execute a data command received on the TCS, the TCS being a series of channels, every channel being a layer of software that implements a specific function, the channels being linked together for processing a piece of data, the data flowing bi-directionally between channels in the series, the data command comprising one of: a read, write or close command;

determine, before the TCS executes the data command, whether to grant the permission by applying a set of rules to a setting of a state variable associated with the TCS, wherein, if data comand is a close command, the set of rules grant permission when the state variable indicates one of: that the TCS is not in use, that a previous read or write data command is done, or that the session is allowed to close and wherein, if data command is a close command, the set of rules do not grant permission when the state variable indicates one of: that the TCS is processing another data read or write command or the session is closing; and wherein, if the data command is a read or write command, the set of rules denies permission when the state variable indicates a close command is pending or has been allowed and grants permission when the state variable indicates that no close command is pending or has been allowed;

wherein the setting is selected from the group consisting of not in use, read pending, close allowed, close pending, read command finishing, read done, write pending, write finishing and write done; and output a result of the permission processing system to the TCS.

20. Computer software embodied in a physical computer readable storage media for managing a communication session on a Transport Communication System (TCS), the computer software comprising instructions to cause a computer system to perform the following functions:

receive a request from a TCS for permission to execute a data command received on the TCS, the TCS being a series of channels, every channel being a layer of software that implements a specific function, the channels being linked together for processing a piece of data, the data flowing bi-directionally between channels in the series, the data command comprising one of: a read, write or close command;

before executing the data command, determining whether to grant the permission by applying a set of rules to a setting of a state variable associated with the TCS, wherein, if data command is a close command, the set of rules grant permission when the state variable indicates one of: that the TCS is not in use, that a previous read or write data command is done, or that the session is allowed to close and wherein, if data command is a close command, the set of rules do not grant permission when the state variable indicates one of: that the TCS is processing another read or write data command or the session is closing; and wherein if the data command is a read or write command, the set of rules denies permission when the state variable indicates a close command is pending or has been allowed and grants permission when the state variable indicates that no close command is pending or has been allowed;

wherein the setting is selected from the group consisting of not in use, read pending, close allowed, close pending, read command finishing, read done, write pending, write finishing and write done; and output a result of the determining to the TCS.

* * * * *